Feb. 20, 1934.  F. LIBERSON  1,948,270
VARIABLE SCREEN FOR USE WITH X-RAYS
Filed Dec. 4, 1930   2 Sheets-Sheet 1

INVENTOR
Frank Liberson
BY
ATTORNEY

Feb. 20, 1934.   F. LIBERSON   1,948,270
VARIABLE SCREEN FOR USE WITH X-RAYS
Filed Dec. 4, 1930   2 Sheets-Sheet 2

INVENTOR
Frank Liberson
BY
ATTORNEY

Patented Feb. 20, 1934

1,948,270

UNITED STATES PATENT OFFICE 1,948,270

VARIABLE SCREEN FOR USE WITH X-RAYS

Frank Liberson, Brooklyn, N. Y.

Application December 4, 1930. Serial No. 499,902

8 Claims. (Cl. 250—34)

The invention relates to X-ray apparatus provided with means for suppressing secondary rays, and more especially of the type utilizing a filter or endless screen member through which the X-rays are required to pass before impinging upon the sensitized photographic plate. I am aware that it has been proposed to utilize an endless screen composed of a number of movable slat members arranged to point always toward the same focus as they pass through the field of exposure.

The present invention has for an object an endless screen member composed of screening elements so arranged that the superposed portions of the said screen afford substantially diamond-shaped spaces permeable to the X-rays, while the bounding surfaces of said spaces serve to intercept and screen out more or less the stray or secondary rays and both in the transverse and longitudinal directions.

A further object of the invention resides in means for accommodating the curvature of the screen to different focal lengths of the X-ray emitting member so as to maintain the maximum efficiency of the screen.

The invention has for a still further object mechanism to accomplish automatically this accommodation to the focal distance.

In carrying out the invention, an endless screen member of the so-called "Bucky" type is arranged to be continuously driven in a manner to pass the novel screen between an X-ray emitting member and a sensitized photographic plate; and the screen is constructed with its secondary ray intercepting portions located at slightly less than a right angle to the longitudinal axis of the screen or line of direction of travel.

The screening elements of the upper and lower portions of the screen will thus cooperate to provide substantially diamond-shaped spaces permeable to the X-rays and bounded by said screening members which serve to intercept substantially the secondary rays.

Moreover, the X-ray emitting member is mounted for adjustment in the direction of its optical axis; and this movement is arranged to be communicated to mechanism for altering the radius of curvature of the endless screen in order that the same may conform to the different focal lengths of the said X-ray emitting member and thus not decrease the efficiency of the screen.

The nature of the invention, however, will best be understood when described in connection with the accompanying drawings, in which.

Figure 1:
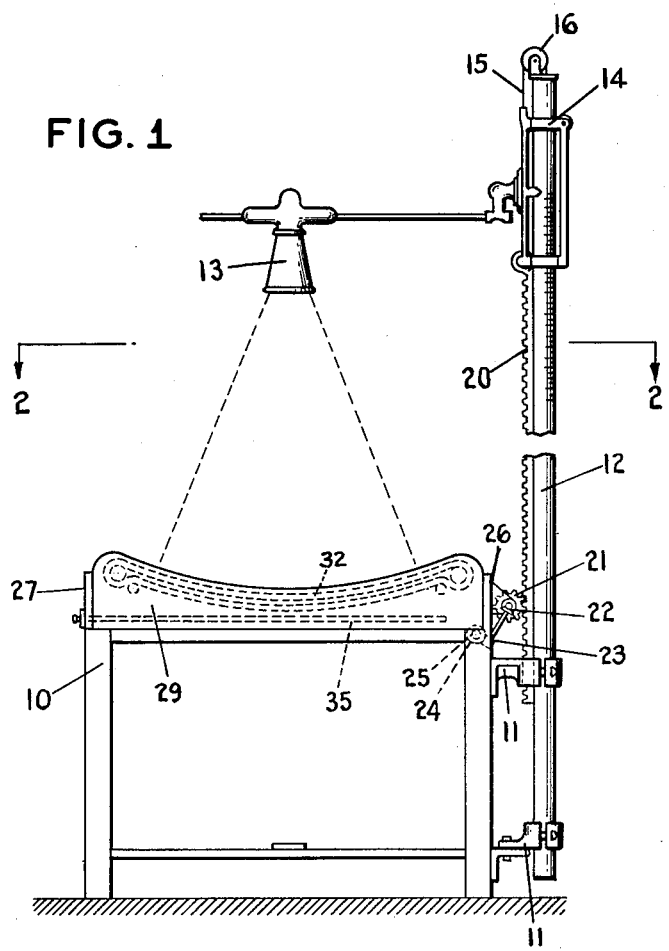
Fig. 1 is a front elevation of the novel X-ray apparatus.
Figure 3:
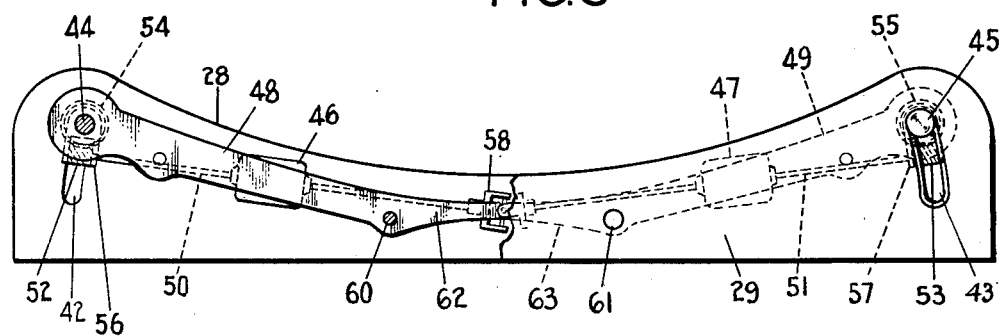
Fig. 3 is an enlarged detail view, illustrating the driving means for the screen.
Figure 2:
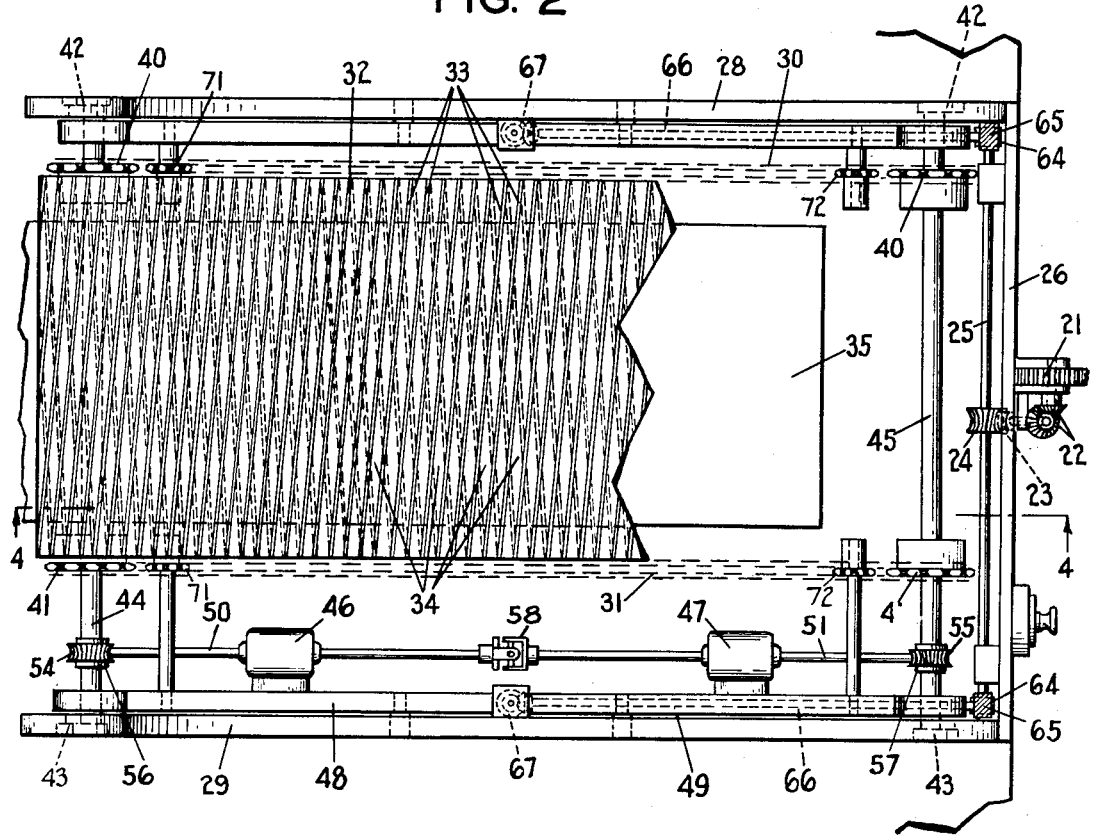
Fig. 2 is a fragmentary section on an enlarged scale, taken on the line 2—2, Fig. 1, and looking in the direction of the arrows.

Referring to the drawings, 10 designates a suitable supporting table for the screening apparatus and to one side of which are also attached brackets 11 for supporting a vertical mast or hollow post 12 carrying the X-ray emitting member 13. This member is arranged to be movably supported by the post 12, as through a carriage 14 slidably mounted thereon which, with the X-ray member, is suitably counter-weighted through a cable connection 15 running over pulley 16 to a counter-weight (not shown) and located within the post.

The carriage 14 carries also a rack member 20, movable therewith and adapted to engage a spur gear 21 and upon the shaft of which is mounted one of a pair of meshing bevel gear wheels 22 adapted to drive a worm or spiral gear 23. Gear 23 in turn meshes with a wheel 24 on a shaft 25, located transversely of the rack and rotatable thereby in accordance with vertical movement of slide 14 and the attached X-ray emitting member 13. The shaft 25 is rotatably mounted in suitable bearings secured to one of the side plates 26 of a frame comprising the said plate 26 and a further side plate 27, as well as a rear end plate 28 and a front end plate 29.

The frame composed of the aforesaid plates is arranged to support a movable endless belt or screen comprising the driving chains 30 and 31, and a screen or filter portion 32 having transversely spaced screening elements 33 which may be of lead or other suitable material to afford a so-called "Bucky" filter or screen. These elements are designed to intercept the secondary or stray rays resulting from the meeting of X-rays with bodies offering certain resistance thereto. They are arranged, moreover, parallel to one another and at preferably an angle slightly less than 90°, for example from 80° to 87° to the longitudinal axis of the endless belt.

It will be apparent, therefore, that as the endless belt is moved, in manner hereinafter set forth, the superposed upper and under portions of the said belt will cooperate to provide diamond-shaped clear spaces 34 or permeable portions through which the X-rays from member 13 will readily pass to a sensitized photographic plate 35 located on the table 10 beneath said screen, while the elements 33 bounding the said diamond-shaped spaces 34 serve to intercept substantially the secondary rays in both transverse and longitudinal directions.

Figure 4:
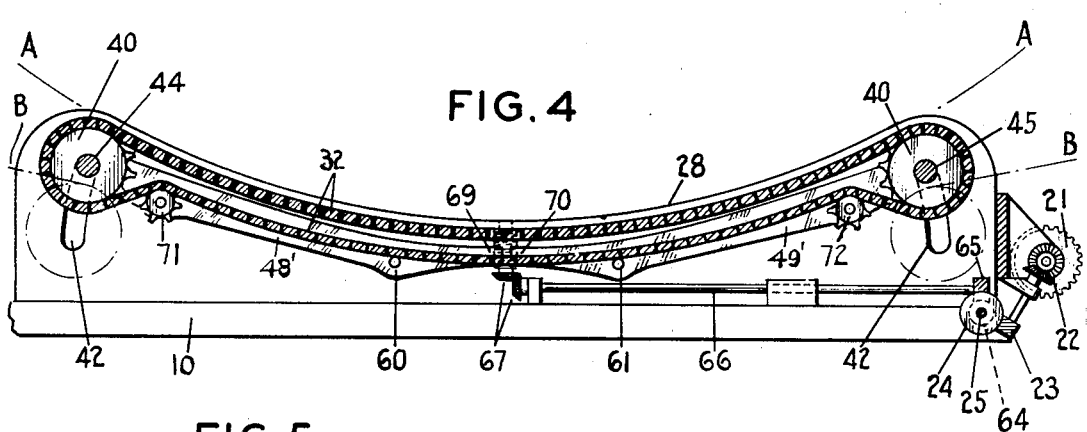
Fig. 4 is a vertical section taken on the line 4—4, Fig. 2 of the drawings, and looking in the direction of the arrows.
Figure 5:
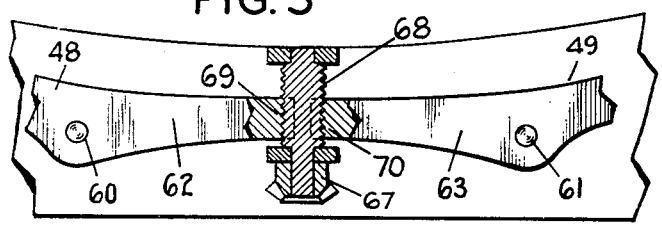
Fig. 5 is a fragmentary enlarged sectional view, illustrating the adjustment feature.

This condition, of course, will apply accurately only for one particular focus of the member 13; and if its focal distance be varied, as is frequently found necessary in X-ray work, it becomes necessary to conform the curvature of the surface of the belt or screen 32 thereto in order to have the X-rays emanating from member 13 substantially normal to the surface for maximum radiation, for example, over a range between the positions indicated by the broken lines A—A and B—B, Fig. 4.

To this end, the pairs 40 and 41 of the driving sprockets engaging the sprocket chains 30 and 31 for the endless belt 32 are mounted for a limited arcuate adjustment relatively to their respective carrying frame plates 28 and 29. Pairs of arcuate slots 42 and 43 are provided for this purpose in the respective end plates 28 and 29 at the opposite ends of said plates; and driving shafts 44 and 45 for the respective sprockets are mounted in the corresponding said arcuate slots and arranged to be adjusted therein as hereinafter set forth.

Suitable driving means such as a pair of motors 46 and 47 are arranged to drive the sprocket shafts 44 and 45, and are carried on arms 48 and 49 swingably mounted upon the front end plate 29. These arms afford bearings also for the shafts 44 and 45 which are driven from the respective motors through intermediate shafts 50, 51 and worms or spiral gears 52, 53 meshing with gear wheels 54, 55 secured on respective shafts 44 and 45. Yokes 56 and 57 hung from the shafts 44 and 45, respectively, afford suitable bearings for the corresponding gears 52 and 53 at the outer ends of shafts 50 and 51. The latter are continued upon the opposite sides of their respective motors, and are connected mid-way between the ends of shafts 44 and 45 and substantially in the median line of the apparatus by a universal joint 58, so that the same driving effect is transmitted synchronously to both sets of sprockets and to the top and bottom of the belt.

The arms 48 and 49, as well as a further pair of arms 48′ and 49′, are fulcrumed to the corresponding end plates as at 60 and 61; and provision is made to draw the inner ends 62 and 63 of these arms upwardly and downwardly in accordance with the motion of slide 14, this motion being transmitted to the shaft 25 as hereinbefore described. From the said shaft, through the spiral gears 64 and 65, rotation is communicated to a further shaft 66 which, through the meshing bevel gear wheels 67 driven by the said shaft 66, effects the operation of a feed screw 68. This feed screw works in the threaded ends 69 and 70 of the arm portions 62 and 63 to effect the movement of said arm ends and adjust their opposite ends which carry the shafts 44 and 45.

Thus, as the lamp 13 is adjusted to different focal lengths relatively to plate 35, the arms 48 and 49 will swing the driving sprockets accordingly and alter thereby the curvature of the belt. Additional and idler sprockets 71 and 72 are secured to the respective arms to take care of any slack developing in the sprocket chains and maintain the curvature of the upper and lower parts of the screen at the particular adjusted position.

While the foregoing arrangement illustrates an automatic changing of the curvature of the screen, it will be appreciated that provision may readily be made for manually obtaining the desired curvature; and that my invention is not, therefore, to be considered as restricted to the automatic arrangement, but covers broadly the novel feature of adjusting the curvature of the screen to the desired arc.

I claim:

1. An X-ray apparatus comprising a screen, means to adjustably mount the same for varying its curvature, an X-ray emitting member associated with the screen to project rays therethrough, means to adjust the focal distance of said member relatively to said screen, and means connecting the focal-distance-adjusting means with the screen-mounting means whereby the curvature of the screen will be adjusted upon movement of the X-ray emitting member to conform to its position.

2. An X-ray apparatus comprising an endless screen, means to adjustably mount the screen for varying its curvature and including means to continuously drive said screen, an X-ray emitting member associated with the screen to project rays therethrough, means to adjust the focal distance of said member relatively to said screen, and means connecting the focal-distance-adjusting means with the screen-mounting means whereby the curvature of the screen will be adjusted upon movement of the X-ray emitting member to conform to its position.

3. An X-ray apparatus comprising a screen, adjustably mounted end-supporting means for the screen, means carried by the end-supporting means for driving said screen continuously an X-ray emitting member associated with the screen to project rays therethrough, means to adjust the focal distance of said member relatively to said screen, and means connecting the focal-distance-adjusting means with the screen-mounting means whereby the curvature of the screen will be adjusted upon movement of the X-ray emitting member to conform to its position.

4. An X-ray apparatus comprising an endless screen, adjustable supporting means for the same including rotatable sprocket members, means carried by the supporting means for rotating said sprocket members, an X-ray emitting member associated with the screen to project rays therethrough, means to adjust the focal distance relatively to said screen, and intermediate mechanism connecting the focal distance adjusting means with said adjustable supporting means to adjust the curvature of the screen upon movement of the X-ray emitting member and in accordance with the position of the latter.

5. An X-ray apparatus comprising a support, an endless continuously driven screen adjustably mounted thereon, an X-ray emitting member associated with the screen to project rays therethrough, means to adjust its focal distance relatively to said screen, driving sprockets for the screen having shafts mounted in arcuate slots of the support, arms fulcrumed to the support and carrying said sprocket shafts, driving means carried by the arms for continuously driving the said shafts, and means to move said arms to correspondingly position the sprockets in their arcuate slots and vary thereby the curvature of the screen to conform to the position of the X-ray emitting member.

6. An X-ray apparatus comprising an adjustably supported frame, the end members of said frame having mounted thereon for movement an endless screen and the side members thereof comprising sections, the sections of each member being movable, means for continuously moving the screen, an X-ray tube and means supporting the same, and mechanism interconnecting said supporting means and the frame whereby said X-ray tube upon movement thereof will cause the screen to assume a predetermined radius of curvature.

7. In an X-ray apparatus for suppressing the shadowing effect of secondary rays, an endless, continuously driven screen including a pair of driving chains therefor, an X-ray emitting member, means to adjust its focal distance relatively to said screen, arcuately slotted end plates between which the said screen is mounted, driving sprockets for the screen chains, shafts to which the respective sprockets are secured, said shafts being mounted to rock in the slots of the plates, means for rotating said sprocket shafts, arms supporting the shafts for the respective driving sprockets and carrying the rotating means for said shafts, said arms being fulcrumed to the end plates, idler sprockets mounted on the arms and engaging the endless driving chains, and intermediate mechanism to communicate movement from the X-ray emitting member to the said arms to correspondingly position the sprockets in their arcuate slots.

8. In an X-ray apparatus for suppressing the shadowing effect of secondary rays, an endless, continuously driven screen including a pair of driving chains therefor, an X-ray emitting member, means to adjust its focal distance relatively to said screen, arcuately slotted end plates between which the said screen is mounted, driving sprockets for the screen chains, shafts to which the respective sprockets are secured and mounted to move in said slots of the plates, two pairs of oppositely directed arms fulcrumed to the respective end plates and supporting said sprocket shafts, a pair of driving motors fixed to the respective arms of one pair of arms, shafts extending therefrom in opposite directions, the outer ends being geared to the corresponding sprocket shafts, a universal joint connecting the inner ends of said shafts, and intermediate mechanism to communicate movement from the X-ray emitting member to the said arms to correspondingly position the sprocket shafts in their arcuate slots.

FRANK LIBERSON.